United States Patent
Chen

(10) Patent No.: US 8,127,072 B2
(45) Date of Patent: Feb. 28, 2012

(54) DATA STORAGE DEVICE AND METHOD FOR ACCESSING FLASH MEMORY

(75) Inventor: Bo Chen, Jhubei (TW)

(73) Assignee: Silicon Motion, Hsinchu (TW)

( * ) Notice: Subject to any disclaimer, the term of this patent is extended or adjusted under 35 U.S.C. 154(b) by 443 days.

(21) Appl. No.: 12/497,665

(22) Filed: Jul. 4, 2009

(65) Prior Publication Data

US 2010/0217918 A1    Aug. 26, 2010

(30) Foreign Application Priority Data

Feb. 24, 2009  (TW) .............................. 98105752 A

(51) Int. Cl.
G06F 12/10 (2006.01)
(52) U.S. Cl. ........................ 711/103; 711/207
(58) Field of Classification Search .................. 711/103, 711/206, 207
See application file for complete search history.

(56) References Cited

U.S. PATENT DOCUMENTS

| 6,347,355 | B1* | 2/2002 | Kondo et al. ................. 711/103 |
| 6,477,632 | B1* | 11/2002 | Kikuchi ......................... 711/203 |
| 7,890,693 | B2* | 2/2011 | Yang et al. ..................... 711/103 |
| 2007/0143569 | A1* | 6/2007 | Sanders et al. ................ 711/203 |
| 2010/0125694 | A1* | 5/2010 | Choi ................................. 711/1 |
| 2010/0180145 | A1* | 7/2010 | Chu .................................. 714/2 |
| 2011/0125954 | A1* | 5/2011 | Yeh et al. ....................... 711/103 |
| 2011/0191521 | A1* | 8/2011 | Araki et al. ................... 711/103 |

* cited by examiner

*Primary Examiner* — John Lane
(74) *Attorney, Agent, or Firm* — Wang Law Firm; Li K. Wang

(57) ABSTRACT

The invention provides a method for accessing a flash memory. In one embodiment, the flash memory comprises a plurality of memory units, each of the memory units has a physical address, and an address link table records a mapping relationship between a plurality of logical addresses and a plurality of physical addresses. First, first data to be written to a first logical address is received from a host. Whether the first data is predetermined data is the determined. Whether the first logical address is mapped to a null physical address is then determined according to the address link table. When the first data is the predetermined data and the first logical address is not mapped to the null physical address according to the address link table, the address link table is modified to map the first logical address to the null physical address.

32 Claims, 5 Drawing Sheets

| Address Link Table | |
|---|---|
| Logic Address | Physical Address |
| $LBA_0$ | Null |
| $LBA_1$ | $PBA_1$ |
| $LBA_2$ | Null |
| $LBA_3$ | $PBA_3$ |
| ⋯ | ⋯ |
| $LBA_N$ | Null |

FIG. 2

DATA STORAGE DEVICE AND METHOD FOR ACCESSING FLASH MEMORY

CROSS REFERENCE TO RELATED APPLICATIONS

This Application claims priority of Taiwan Patent Application No. 98105752, filed on Feb. 4, 2009, the entirety of which is incorporated by reference herein.

BACKGROUND OF THE INVENTION

1. Field of the Invention

The invention relates to flash memories, and more particularly to accessing flash memories.

2. Description of the Related Art

A flash memory is a non-volatile memory that can be electrically erased and reprogrammed. Flash memories are primarily used in memory cards and USB flash drives for general storage. Flash memory costs far less than EEPROM and therefore has become a dominant memory device. Examples of electronic device applications include Personal Digital Assistants (PDA) and laptop computers, digital audio players, digital cameras, and mobile phones.

A flash memory comprises a large number of memory units, and each memory unit, has a physical address. Data recorded in memory units of a flash memory is accessed according to the physical addresses of the memory units. When a host wants to access data stored in a flash memory, the host, however, accesses the data according to logical addresses of the data. Because the logical addresses are not identical to the physical addresses, a data storage device comprising the flash memory must first convert the logical addresses sent from the host to physical addresses, and then access data stored in the flash memory according to the physical addresses.

Generally, a data storage device records a mapping relationship between logical addresses and physical addresses of a flash memory in an address link table as the basis for conversion of the logical addresses to the physical addresses. The address link table is built when the flash memory is initialized. Each physical address of the flash memory therefore has a corresponding logical address mapped thereto according to the address link table.

The conventional data storage device, however, has some disadvantages. First, because each physical address of the flash memory has a corresponding logical address mapped thereto, each host access of a logical address leads to a physical access of a memory unit, with a physical address to which the logical address will be mapped. A great number of memory units of the flash memory, however, store no data. When a host wants to access a logical address mapped to a memory unit storing no data, the memory access generates no meaningful results, merely consumes system resources and causes system delay.

In addition, because each physical address of the flash memory has a corresponding logical address mapped thereto, the host can access all memory units of the flash memory. In addition to the flash memory, the data storage device also comprises a controller. Because all memory units of the flash memory can be accessed by the host, when the controller requires storing data, the controller cannot use empty memory units of the flash memory for data storage, resulting in a waste of system resources. Thus, a method for accessing a flash memory is required.

BRIEF SUMMARY OF THE INVENTION

The invention provides a method for accessing a flash memory. In one embodiment the flash memory comprises a plurality of memory units, each of the memory units has a physical address, and an address link table records mapping relationship between a plurality of logical addresses and a plurality of physical addresses. First, first data to be written to a first logical address is received from a host. Whether the first data is predetermined data is the determined. Whether the first logical address is mapped to a null physical address is then determined according to the address link table. When the first data is the predetermined data and the first logical address is not mapped to the null physical address according to the address link table, the address link table is modified to map the first logical address to the null physical address.

The invention provides another method for accessing a flash memory. In one embodiment, the flash memory comprises a plurality of memory units, each of the memory units has a physical address, and an address link table records mapping relationship between a plurality of logical addresses and a plurality of physical addresses. First, first data to be written to a first logical address is received from a host. Whether the first data is predetermined data is then determined. Whether the first logical address is mapped to a null physical address is then determined according to the address link table. When the first data is not the predetermined data and the first logical address is mapped to the null physical address according to the address link table, the address link table is modified to mapping the first logical address to a second physical address, and the first data is written to a second memory unit, with the second physical address.

The invention provides another method for accessing a flash memory. In one embodiment, the flash memory comprises a plurality of memory units, each of the memory units has a physical address, and an address link table records mapping relationship between a plurality of logical addresses and a plurality of physical addresses. First, first data to be written to a first logical address is received from a host. Whether the first data is predetermined data is determined. Whether the first logical address is mapped to a null physical address is also determined according to the address link table. When the first data is not the predetermined data and the first logical address is not mapped to the null physical address according to the address link table, the first data is written to a first memory unit with a first physical address to which the first logical address is mapped according to the address link table.

The invention provides a data storage device. In one embodiment, the flash memory data comprises a flash memory, an address link table, and a controller. The flash memory comprises a plurality of memory units, each of the memory units has a physical address. The address link table records a mapping relationship between a plurality of logical addresses and a plurality of physical addresses. The controller receives first data to be written to a first logical address from a host, determines whether the first data is predetermined data, determines whether the first logical address is mapped to a null physical address according to the address link table, and modifies the address link table to map the first logical address to the null physical address when the first data is the predetermined data and the first logical address is not mapped to the null physical address according to the address link table.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 2 is a schematic diagram of an embodiment of an address link table according to the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
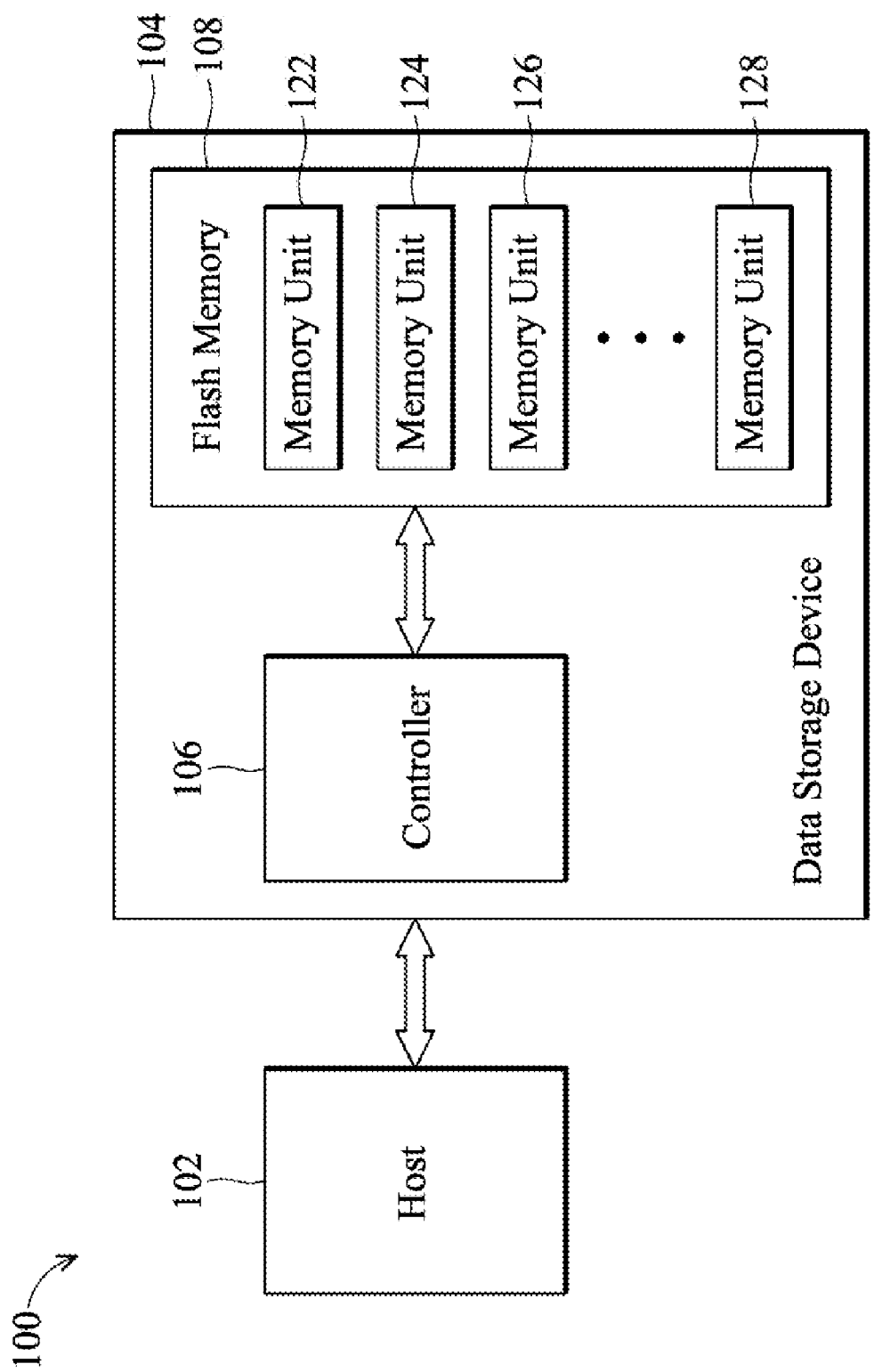
FIG. 1 is a block diagram of a data storage device according the invention.

Referring to FIG. 1, a block diagram of a data storage device 104 according the invention is shown. The data storage device 104 stores data for a host 102. In one embodiment, the data, storage device 104 comprises a controller 106 and a flash memory 108. The flash memory 108 comprises a plurality of memory units 122~128 for storing data. The memory units 122~128 may be blocks, pages, or sectors of the flash memory 108. Each memory unit has a corresponding physical address and is accessed according to the physical address. The controller 106 receives access commands and logical addresses from the host 102, converts the logical addresses to physical addresses, and accesses memory units with the physical addresses in the flash memory 108 according to the access commands. In one embodiment, the flash memory 108 is a NAND flash memory.

An address link table records a mapping relationship between a plurality of logical addresses and a plurality of physical addresses of the flash memory 108. The controller 106 can therefore map logical addresses received from the host 102 to physical addresses according to the address link table. The address link table us initialized and modified by the controller 106. In one embodiment, the address link table is stored in the flash memory 108. In another embodiment, the address link table is stored in registers of the controller 106.

In a conventional address link table, each logical address is mapped to a physical address of a flash memory. In the address link table provided by the invention, the address link table comprises logical addresses not mapped to physical addresses. The logical addresses not mapped to physical addresses are mapped to a null physical address in the address link table. In one embodiment, the null physical address is an address comprising all the same bits 0 or 1. When the address link table is initialized, the controller 106 maps all logical addresses recorded in the address link table to the null physical address. Referring to FIG. 2, a schematic diagram of an embodiment of an address link table 200 according to the invention is shown. In the address link table 200, logical addresses $LBA_1$ and $LBA_3$ are respectively mapped to physical addresses $PBA_1$ and $PBA_3$. Logical addresses $LBA_0$, $LBA_2$, and $LBA_3$ are mapped to a null physical address. The logical addresses $LBA_0$, $LBA_2$, and $LBA_3$ therefore do not map to physical addresses of the flash memory 108.

Figure 3:
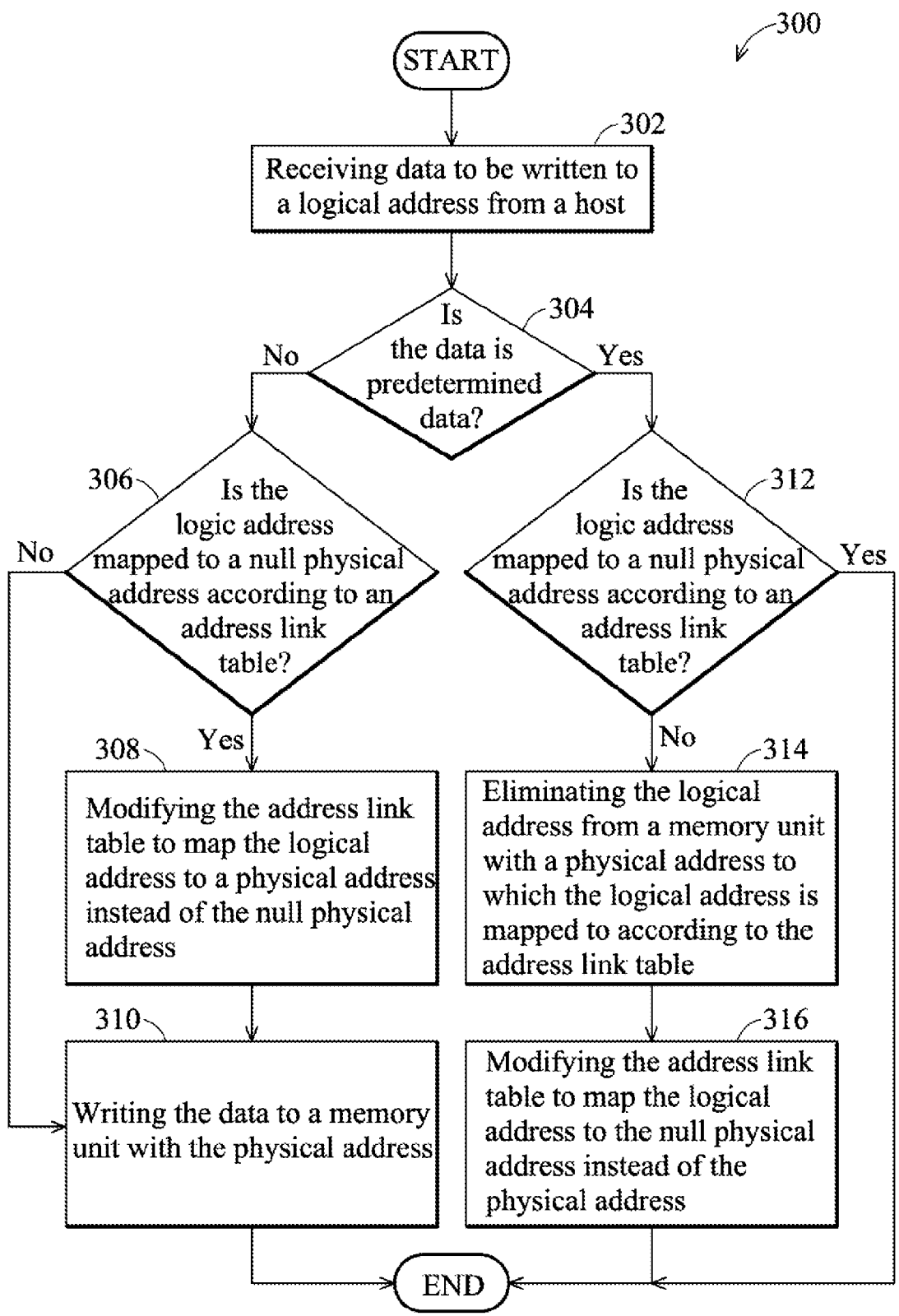
FIG. 3 is a flowchart of a method for writing data to a flash memory according to the invention.

Referring to FIG. 3, a flowchart of a method 300 for writing data to the flash memory 108 according to the invention is shown. First, the controller 106 receives data to be written to a logical address from the host 102 (step 302). The controller 106 then determines whether the received data is predetermined data (step 304). In one embodiment, the predetermined data comprises all the same bits 0 or 1. In another embodiment, the predetermined data comprises interlaced bits 0 and 1, such as 01010. The controller 106 checks the address link table to determine whether the logic address is mapped to a null physical address (steps 306 and 312).

If the received data is not the predetermined data, the received data is not null data. When the logical address to be written by the host 102 is not mapped to the null physical address according to the address link table, the controller 106 can determine a physical address to which the logical address will be mapped according to the address link table, and can then determine a memory unit having the physical address. The controller 106 then writes the received data to the memory unit with the physical address (step 310). Otherwise, when the logical address to be written by the host 102 is mapped to the null physical address according to the address link table, the controller 106 cannot determine a memory unit with the null physical address. The controller 106 therefore selects an empty memory unit from the flash memory 108, modifies the address link table to map the logical address to the physical address of the selected memory unit (step 308), and writes the received data to the selected memory unit (step 310).

If the received data is the predetermined data, the received data is null data. When the logical address to be written by the host 302 is mapped to the null physical address according to the address link table, the host 102 is requesting the controller 106 to write null data to null physical address. The controller 106 therefore does not need to respond to the host's request. Otherwise, when the logical address to be written by the host 102 is not mapped to the null physical address according to the address link table, the controller 106 can determine a physical address to which the logical address will be mapped according to the address link table. When the host 102 requests the controller 106 to write null data to the physical address, the host 102 is assumed to be requesting the controller 106 to eliminate the mapping relationship between the logical address and the physical address from the address link table. The controller 106 therefore determines a memory unit with the physical address, eliminates the logical address recorded in the memory unit with the physical address (step 314), and then modifies the address link table to map the logical address to the null physical address (step 316).

Figure 4:
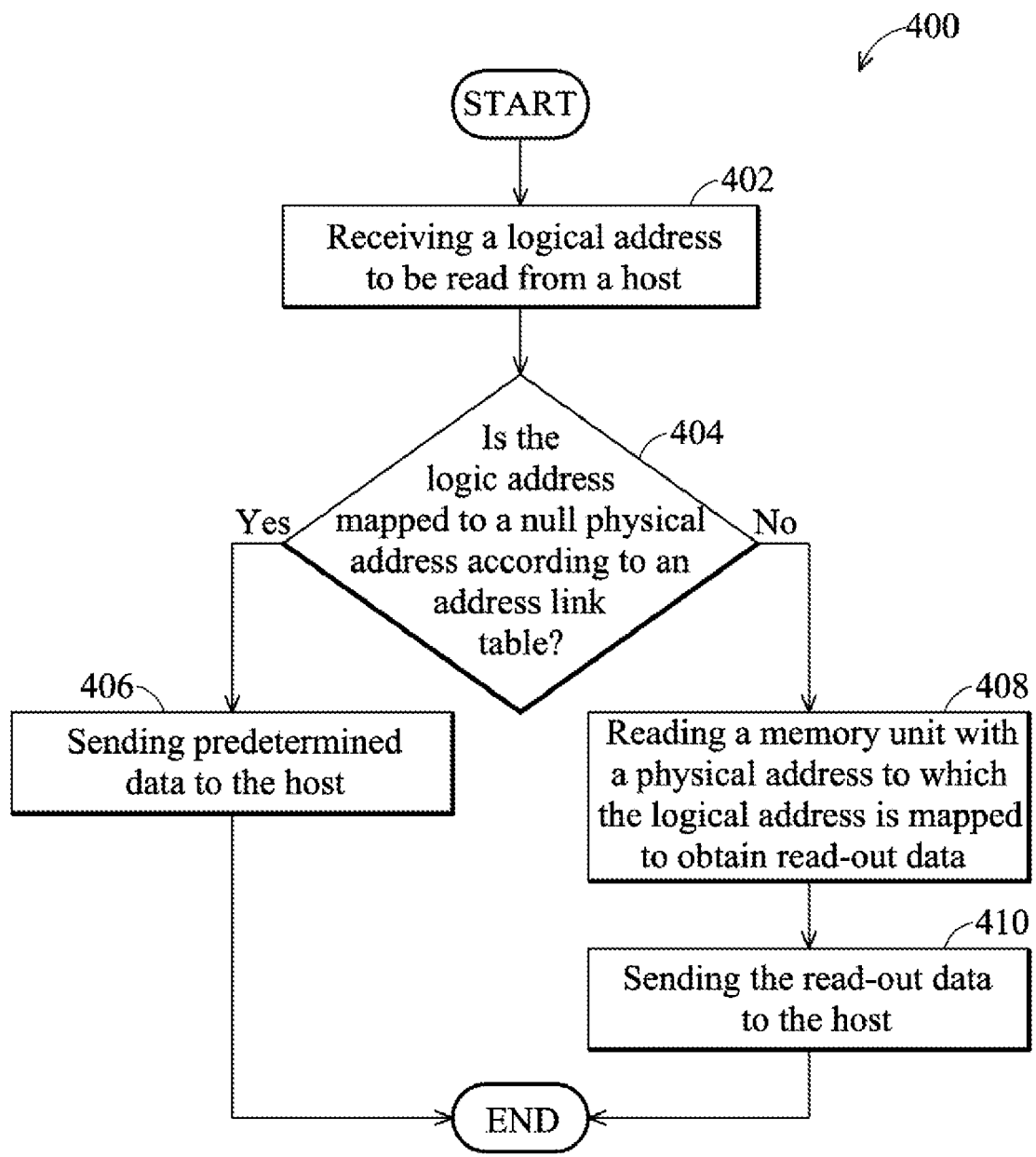
FIG. 4 is a flowchart of a method for reading data from a flash memory according to the invention.

Referring to FIG. 4, a flowchart of a method 400 for reading data from a flash memory 108 according to the invention is shown. First, the controller 106 receives a logical address to be read, from the host 102 (step 402). The controller 106 then checks the address link table to determine whether the logic address is mapped to a null physical address according to the address link table (step 404). If so, the controller 106 cannot find a memory unit with the null physical address in the Hash memory 108. The controller 106 therefore directly sends predetermined data to the host 102 in response (step 406). The controller 106 therefore does not need to physically access a memory unit of the flash memory 108, thus not wasting system resources. Otherwise, when the logic address is not mapped to a null physical address according to the address link table, the controller 106 can determine a physical address to which the logical address will be mapped according to the address link table, and then determines a memory unit with the physical address. The controller 106 then reads the memory unit with the physical address in the flash memory 108 to obtain read-out data (step 408), and then sends the read-out data to the host 102 (step 410).

Figure 5:
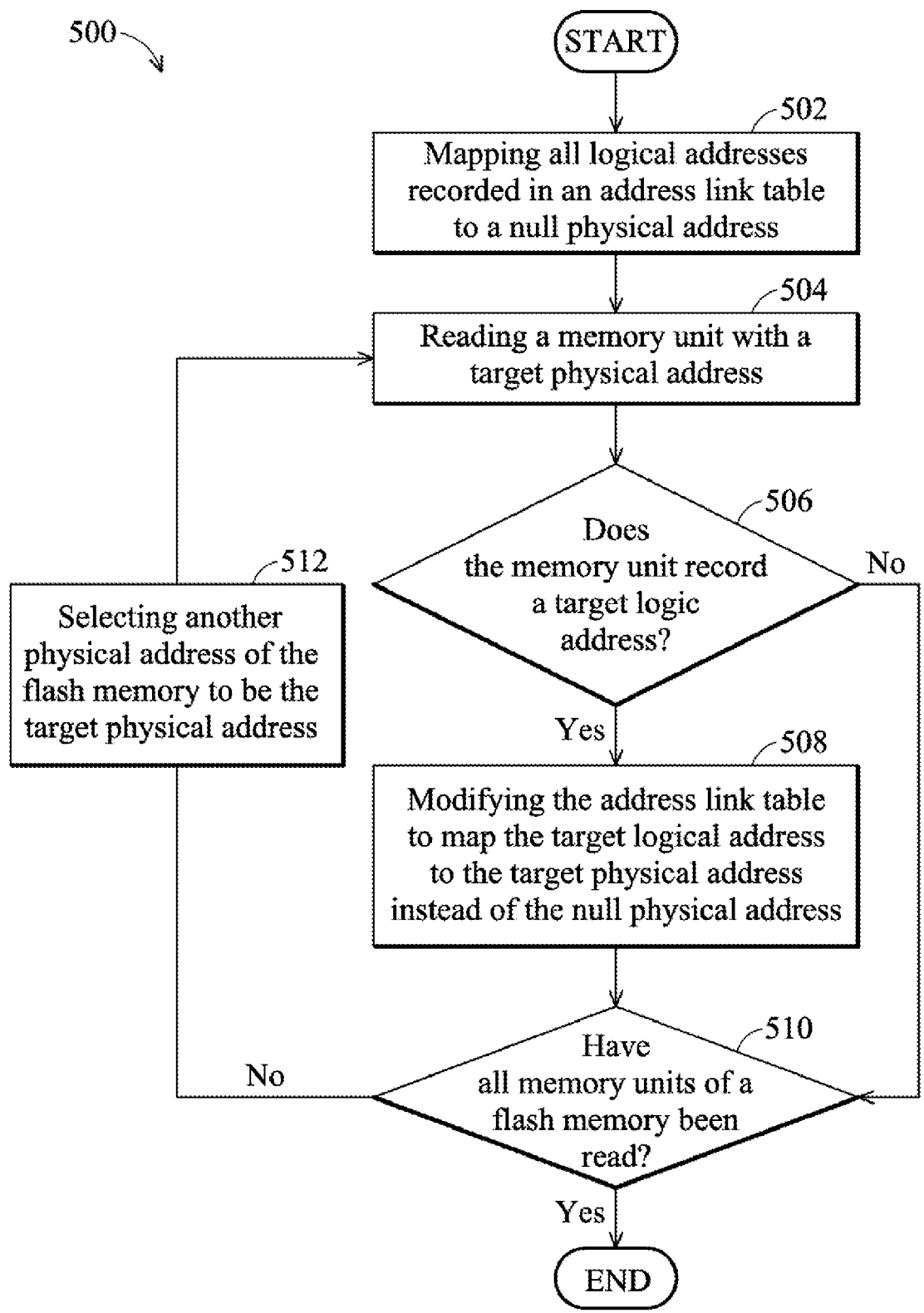
FIG. 5 is a flowchart of a method for rebuilding an address link table according to the invention.

When a power supply of the data storage device 104 is suddenly shut off, the address link table of the data storage device 104 may be damaged. The data storage device therefore must rebuild the address link table thereof. Referring to FIG. 5, a flowchart of a method 500 for rebuilding an address link table according to the invention is shown. First, the controller 106 maps all logical addresses recorded in the address link table to a null physical address (step 502). The controller 106 then reads a memory unit with a target physical address (step 504). If the memory unit with the target physical address stores a target, logical address (step 506), the controller 106 modifies the address link table to map the target logical address to the target physical address (step 508). When the controller 106 has not read all memory units of the flash memory 108 (step 510), the controller 106 selects another physical address of the flash memory 108 to be the target physical address (step 512), and then repeats the steps 504~510 with the new target physical address. When all memory units of the flash memory 108 have been read by the controller 106, rebuilding of the address link table is completed.

The invention provides a method for accessing a flash memory. Some logical addresses recorded in an address link table provided by the invention are not mapped to physical addresses of a flash memory. Instead, the logical addresses are mapped to a null physical address in the address link table. When the address link table comprises more logical addresses mapped to the null physical address, the flash memory comprises more memory units with physical addresses to which no logical addresses are mapped, and the physical addresses can be used by the controller for data storage. In addition, the host can eliminate a mapping relationship between a logical address and a physical address from the address link table by writing predetermined data to the physical address. Moreover, when the host writes data to a logical address mapped to a null physical address or reads data from a logical physical address mapped to the null physical address, the controller does not have to physically access the flash memory, thus not wasting system resources.

While the invention has been described by way of example and in terms of preferred embodiment, it is to be understood that the invention is not limited thereto. To the contrary, it is intended, to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for accessing a flash memory, wherein the flash memory comprises a plurality of memory units, each of the memory units has a physical address, and an address link table records a mapping relationship between a plurality of logical addresses and a plurality of physical addresses, comprising:

receiving first data to be written to a first logical address from a host;

determining whether the first data is predetermined data;

determining whether the first logical address is mapped to a null physical address according to the address link table; and when the first data is the predetermined data, and the first logical address is not mapped to the null physical address according to the address link table, modifying the address link table to map the first logical address to the null physical address.

2. The method as claimed in claim 1, wherein the method further comprises:

when the first data is not the predetermined data, and the first logical address is not mapped to the null physical address according to the address link table, writing the first data to a first memory unit with a first physical address to which the first logical address is mapped according to the address link table; and when the first data is not the predetermined data, and the first logical address is mapped to the null physical address according to the address link table, modifying the address link table to mapping the first logical address to a second physical address, and writing the first, data to a second memory unit with the second physical address.

3. The method as claimed in claim 1, wherein each of the memory units stores a logical address mapped to a physical address thereof, and the method further comprises:

when the first data is the predetermined data, and the first logical address is not mapped to the null physical address according to the address link table, eliminating the first logical address from a first memory unit with a first physical address to which the first logical address is mapped according to the address link table.

4. The method as claimed in claim 1, wherein the method further comprises:

receiving a second logical address to be read from the host;

determining whether the second logical address is mapped to the null physical address according to the address link table;

when the second logical address is mapped to the null physical address, sending the predetermined data to the host; and when the second logical address is not mapped to the null physical address, reading a memory unit with a third physical address to which the second logical address is mapped according to the address link table to obtain second data, and sending the second data to the host.

5. The method as claimed in claim 1, wherein the predetermined data comprises all of the same bit 0 or bit 1.

6. The method as claimed in claim 1, wherein the null physical address is an address comprising all of the same bit 0 or bit 1.

7. The method as claimed in claim 1, wherein the method further comprises:

when the address link table is initialized, mapping all logical addresses recorded in the address link table to the null physical address.

8. The method as claimed in claim 1, wherein the method further comprises:

when the address link table is initialized, mapping all logical addresses recorded in the address link table to the null physical address;

selecting a target physical address from the physical addresses of all the memory units of the flash memory;

reading a target memory unit with the target physical address to determine whether the target memory unit stores information about a target logical address;

when the target memory unit stores information about the target logical address, modifying the address link table to map the target logical address to the target physical address; and repeating selection of the target physical address, reading of the target memory unit, and modifying of the address link table to map the target logical address to the target physical address until the physical addresses of all the memory units are selected to be the target, physical address.

9. The method as claimed in claim 1, wherein the memory units are blocks, pages, or sectors of the flash memory.

10. A method for accessing a flash memory, wherein the flash memory comprises a plurality of memory units, each of the memory units has a physical address, and an address link table records a mapping relationship between a plurality of logical addresses and a plurality of physical addresses, comprising:

receiving first data to be written to a first logical address from a host;

determining whether the first data is predetermined data;

determining whether the first logical address is mapped to a null physical address according to the address link table; and when the first data is not the predetermined data, and the first logical address is mapped to the null physical address according to the address link table, modifying the address link table to mapping the first logical address to a second physical address, and writing the first data to a second memory unit with the second physical address.

11. The method as claimed in claim 10, wherein the method further comprises:

when the first data is not the predetermined data, and the first logical address is not mapped to the null physical address according to the address link table, writing the first data to a first memory unit with a first physical address to which the first logical address is mapped according to the address link table; and when the first data is the predetermined data, and the first logical address is not mapped to the null physical address according to the address link table, modifying the address link table to map the first logical address to the null physical address.

12. The method as claimed in claim 11, wherein each of the memory units stores a logical address mapped to a physical address thereof, and the method further comprises:

when the first data is the predetermined data, and the first logical address is not mapped to the null physical address according to the address link table, eliminating the first logical address from a first memory unit with a first physical address to which the first logical address is mapped according to the address link table.

13. The method as claimed in claim 10, wherein the method further comprises:

receiving a second logical address to be read from the host;

determining whether the second logical address is mapped to the null physical address according to the address link table;

when the second logical address is mapped to the null physical address, sending the predetermined data to the host; and when the second logical address is not mapped to the null physical address, reading a memory unit with a third physical address to which the second logical address is mapped according to the address link table to obtain second data, and sending the second data to the host.

14. The method as claimed in claim 10, wherein the method further comprises:

when the address link table is initialized, mapping all logical addresses recorded, in the address link table to the null physical address.

15. The method as claimed in claim 10, wherein the method further comprises:

when the address link table is initialized, mapping all logical addresses recorded in the address link table to the null physical address;

selecting a target physical address from the physical addresses of all the memory units of the flash memory;

reading a target memory unit with the target physical address to determine whether the target memory unit stores information about a target logical address;

when the target memory unit stores information about the target logical address, modifying the address link table to map the target logical address to the target physical address; and repeating selection of the target physical address, reading of the target memory unit, and modifying of the address link table to map the target logical address to the target physical address until the physical addresses of all the memory units are selected to be the target physical address.

16. The method as claimed in claim 10, wherein the memory units are blocks, pages, or sectors of the flash memory.

17. A method for accessing a flash memory, wherein the flash memory comprises a plurality of memory units, each of the memory units has a physical address, and an address link table records a mapping relationship between a plurality of logical addresses and a plurality of physical addresses, comprising:

receiving first data to be written to a first logical address from a host;

determining whether the first data is predetermined data;

determining whether the first logical address is mapped to a null physical address according to the address link table; and when the first data is not the predetermined data, and the first logical address is not mapped to the null physical address according to the address link table, writing the first data to a first memory unit with a first physical address to which the first logical address is mapped according to the address link table.

18. The method as claimed in claim 17, wherein the method further comprises:

when the first data is the predetermined data, and the first logical address is not mapped to the null physical address according to the address link table, modifying the address link table to map the first logical address to the null physical address: and when the first data is not the predetermined data, and the first logical address is mapped to the null physical address according to the address link table, modifying the address link table to mapping the first logical address to a second physical address, and writing the first data to a second memory unit with the second physical address.

19. The method as claimed in claim 18, wherein each of the memory units stores a logical address mapped to a physical address thereof, and the method further comprises:

when the first data is the predetermined data, and the first logical address is not mapped to the null physical address according to the address link table, eliminating the first logical address from a first memory unit with a first physical address to which the first logical address is mapped according to the address link table.

20. The method as claimed in claim 17, wherein the method further comprises:

receiving a second logical address to be read from the host;

determining whether the second logical address is mapped to the null physical address according to the address link table;

when the second logical address is mapped to the null physical address, sending the predetermined data to the host; and when the second logical address is not mapped to the null physical address, reading a memory unit with a third physical address to which the second logical address is mapped according to the address link table to obtain second data, and sending the second data to the host.

21. The method as claimed in claim 17, wherein the method further comprises:
when the address link table is initialized, mapping all logical addresses recorded in the address link table to the null physical address.

22. The method as claimed in claim 17, wherein the method further comprises:
when the address link table is initialized, mapping all logical addresses recorded in the address link table to the null physical address;
selecting a target physical address from the physical addresses of all the memory units of the flash memory;
reading a target memory unit with the target physical address to determine whether the target memory unit stores information about a target logical address;
when the target memory unit stores information about the target logical address, modifying the address link table to map the target logical address to the target physical address; and
repeating selection of the target physical address, reading of the target memory unit, and modifying of the address link table to map the target logical address to the target physical address until the physical addresses of all the memory units are selected to be the target physical address.

23. The method as claimed in claim 17, wherein the memory units are blocks, pages, or sectors of the flash memory.

24. A data storage device, comprising:
a flash memory, comprising a plurality of memory units, each of the memory units has a physical address;
an address link table, recording a mapping relationship between a plurality of logical addresses and a plurality of physical addresses; and
a controller, receiving first data to be written to a first logical address from a host, determining whether the first data is predetermined data, determining whether the first logical address is mapped to a null physical address according to the address link table, and modifying the address link table to map the first logical address to the null physical address when the first data is the predetermined data and the first logical address is not mapped to the null physical address according to the address link table.

25. The data storage device as claimed in claim 24, wherein the controller writes the first data to a first memory unit with a first physical address to which the first logical address is mapped according to the address link table when the first data is not the predetermined data and the first logical address is not mapped to the null physical address according to the address link table, and modifies the address link table to mapping the first logical address to a second physical address and then writes the first data to a second memory unit with the second physical address when the first, data is not the predetermined, data and the first logical address is mapped to the null physical address according to the address link table.

26. The data storage device as claimed in claim 24, wherein each of the memory units stores a logical address mapped to a physical address thereof, and the controller further eliminates the first logical address from a first, memory unit with a first physical address to which the first logical address is mapped according to the address link table when the first data is the predetermined data and the first logical address is not mapped to the null physical address according to the address link table.

27. The data storage device as claimed in claim 24, wherein when the controller receives a second logical address to be read from the host, the controller determines whether the second logical address is mapped to the null physical address according to the address link table, sends the predetermined data to the host when the second logical address is mapped to the null physical address, and reads a memory unit with a third physical address to which the second logical address is mapped according to the address link table to obtain second data and sends the second data to the host when the second logical address is not mapped to the null physical address.

28. The data storage device as claimed in claim 24, wherein the predetermined data comprises all of the same bit 0 or bit 1.

29. The data storage device as claimed in claim 24, wherein the null physical address is an address comprising all of the same bit 0 or bit 1.

30. The data storage device as claimed in claim 24, wherein the controller maps all logical addresses recorded in the address link table to the null physical address when the address link table is initialized.

31. The data storage device as claimed in claim 24, wherein when the address link table is initialized, the controller maps all logical addresses recorded in the address link table to the null physical address, selects a target physical address from the physical addresses of all the memory units of the flash memory, reads a target memory unit with the target physical address to determine whether the target memory unit stores information about a target logical address, modifies the address link table to map the target logical address to the target physical address when the target memory unit stores information about the target logical address, and repeats selection of the target physical address, reading of the target, memory unit, and modifying of the address link table to map the target logical address to the target physical address until the physical addresses of all the memory units are selected to be the target physical address.

32. The data storage device as claimed in claim 24, wherein the memory units are blocks, pages, or sectors of the flash memory.

* * * * *